United States Patent
Dick

(10) Patent No.: US 8,666,336 B1
(45) Date of Patent: Mar. 4, 2014

(54) DIGITAL PRE-DISTORTION WITH MODEL-BASED ORDER ESTIMATION

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 22 days.

(21) Appl. No.: 13/587,804

(22) Filed: Aug. 16, 2012

(51) Int. Cl.
*H04B 1/04* (2006.01)
*H04B 17/00* (2006.01)

(52) U.S. Cl.
USPC ............ 455/114.3; 455/63.1; 455/67.13; 375/296; 375/297

(58) Field of Classification Search
USPC ......... 455/63.1, 67.13, 69, 114.1, 114.2, 455/114.3, 127.1, 522; 375/296, 297
See application file for complete search history.

(56) References Cited

U.S. PATENT DOCUMENTS

| | | | |
|---|---|---|---|
| 7,102,430 B2 * | 9/2006 | Johnson et al. | 330/149 |
| 7,418,056 B2 * | 8/2008 | Suzuki et al. | 375/296 |
| 7,795,858 B2 * | 9/2010 | Tufillaro et al. | 324/76.21 |
| 8,331,484 B2 * | 12/2012 | Silverman et al. | 455/114.3 |
| 2011/0032032 A1 | 2/2011 | Pinon | |

OTHER PUBLICATIONS

Li, Hui et al., "Nonlinear Least Squares Lattice Algorithm for Identifying the Power Amplifier with Memory Effects,"*Proc. of the IEEE 63rd Vehicular Technology Conference*, May 7, 2006, pp. 2149-2153, IEEE, Piscataway, New Jersey, USA.
Mekechuk, Kelly et al., "Linearizing Power Amplifiers Using Digital Predistortion, EDA Tools and Test Hardware," *High Frequency Electronics*, Apr. 2004, pp. 1-7, Summit Technical Media, LLC, Bedford, NH, USA.

* cited by examiner

*Primary Examiner* — Quochien B Vuong
(74) *Attorney, Agent, or Firm* — W. Eric Webostad

(57) ABSTRACT

An embodiment of an integrated circuit is disclosed. This embodiment includes a processor programmed with a behavior model associated with power amplification. A calibration signal generator is coupled to the processor and configured to generate a digital calibration signal. The processor is coupled to receive a digital feedback signal. The processor is configured to determine at least one parameter associated with the power amplification in response to the digital feedback signal using the behavior model. The at least one parameter is selected from a group consisting of a nonlinearity order and a memory length. A digital predistorter is coupled for parameterization responsive to the at least one parameter.

20 Claims, 5 Drawing Sheets

DIGITAL PRE-DISTORTION WITH MODEL-BASED ORDER ESTIMATION

TECHNICAL FIELD

An embodiment relates to integrated circuit devices ("ICs"). More particularly, an embodiment relates to digital pre-distortion with model-based order estimation for an IC.

BACKGROUND

Power amplifier linearity is relevant in the design of communication systems. High peak-to-average ratios ("PARs") tend to exist in wideband communication systems. A PAR may be considered a function of a transmission waveform, such as for example an orthogonal frequency division multiplexing ("OFDM") waveform for a 3GPP Long-Term Evolution ("LTE") system or a wideband code division multiple access ("W-CDMA") waveform for a Universal Mobile Telecommunications System ("UMTS") system. Because such waveforms have high PARs, power amplifiers with high degrees of linearity may be used to reduce spectral artifacts in the output of such power amplifiers, namely in transmission waveforms. Unfortunately, conventionally a power amplifier with a high degree of linearity also comes with a high cost. Further, unfortunately, conventionally a low cost power amplifier has a low degree of linearity. One approach to power amplifier linearization for operating in an efficient input-to-output operating range of a power amplifier involves use of digital pre-distortion.

Digital predistortion or digital pre-distortion is used to linearize a nonlinear response of a power amplifier over a power range of such power amplifier. More particularly, a baseband signal may be distorted before amplification by a power amplifier. A type of digital predistorter may be one that employs a conventional memory polynomial. Such conventional memory polynomial configured digital predistorter may be used for power amplification in a variety of applications, including without limitation an amplification of power for a wireless signal (e.g., for a wideband wireless communication system as indicated above), an amplification of power for a land-line signal (e.g., a backhaul link between a cellular base station and a gateway to an Internet Protocol network), and an amplification of power a signal for a satellite link. However, a conventional memory polynomial configured digital predistorter may involve a time-consuming heuristic selection process for selection of nonlinearity order ("K"), and memory length ("Q").

With respect to selection of K and Q for digital predistortion to condition a signal subsequently provided to a power amplifier, selecting K and Q too large may significantly increase compute complexity, and thus power consumption, without a sufficient return in power amplifier performance, while selecting K and Q too small may underutilize power amplifier performance. Heretofore, a power amplifier was generally heuristically characterized in a laboratory by iteratively feeding such power amplifier signals to determine K and Q. However, this process for power amplifier characterization does not lend itself to determining K and Q in the field, namely apart from such a laboratory setting. Furthermore, setting a digital predistorter heretofore involved prior knowledge of a power amplifier to which such digital predistorter was to be coupled.

Accordingly, it would be desirable and useful to be able to select K and/or Q in the field.

SUMMARY

One or more embodiments generally relate to digital pre-distortion with model-based order estimation for an IC.

An embodiment relates generally to a method for parameterizing a digital predistorter. In such an embodiment, a digital calibration signal is generated. The digital calibration signal is converted to an analog calibration signal. The analog calibration signal is modulated onto a carrier signal. The carrier signal modulated with the analog calibration signal is power amplified to provide a transmission signal. The transmission signal is fed back. The transmission signal is demodulated to obtain an analog feedback signal. The analog feedback signal is a version of the analog calibration signal after power amplification. The analog feedback signal is converted to a digital feedback signal. The digital feedback signal is provided to a programmed processor. The programmed processor generates at least one parameter selected from a group consisting of a nonlinearity order and a memory length. The digital predistorter parameterized is provided with the at least one parameter.

An embodiment relates generally to a method for parameterizing a digital predistorter. In such an embodiment, a digital calibration signal is generated at a baseband frequency. The digital calibration signal is converted to an analog calibration signal at the baseband frequency. The analog calibration signal is modulated and up converted onto a carrier signal at a transmission frequency. The carrier signal modulated with the analog calibration signal is power amplified with a power amplifier to provide a transmission signal. The transmission signal is fed back. The transmission signal is demodulated and down converted to obtain an analog feedback signal at the baseband frequency. The analog feedback signal is a version of the analog calibration signal after power amplification. The analog feedback signal is converted to a digital feedback signal. The digital feedback signal is provided to a programmed processor. A predefined nonlinearity order is provided to the programmed processor. The programmed processor generates a memory length responsive to the digital feedback signal for the predefined nonlinearity order. The digital predistorter is parameterized with the memory length.

An embodiment relates generally to an integrated circuit. In such an embodiment, a processor is programmed with a behavior model associated with power amplification. A calibration signal generator is coupled to the processor and configured to generate a digital calibration signal. The processor is coupled to receive a digital feedback signal. The processor is configured to determine at least one parameter associated with the power amplification in response to the digital feedback signal using the behavior model. The at least one parameter is selected from a group consisting of a nonlinearity order and a memory length. A digital predistorter is coupled for parameterization responsive to the at least one parameter.

BRIEF DESCRIPTION OF THE DRAWINGS

Accompanying drawings show exemplary embodiments in accordance with one or more aspects. However, the accompanying drawings should not be taken to limit the invention to the embodiments shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

A discrete baseband memory polynomial model to mathematically characterize nonlinear behavior and memory effects of a power amplifier for input x(n) and output y(n) may be mathematically represented as set forth in Equation (1):

$$y(n) = \sum_{i=1}^{K} \sum_{j=1}^{Q} w_{i,j}^* \cdot x(n-j) \cdot |x(n-j)|^{i-1} \tag{1}$$

where $w_{i,j}$ is a complex coefficient and * denotes a complex conjugate. This model has nonlinearity order, K, and memory length, Q. Using nonlinearity order, K, and memory length, Q, an input modulation signal may be predistorted for subsequent input to a power amplifier with nonlinear behavior and memory effects. Such predistortion can be used to enhance linearity of such power amplifier over an efficient input-to-output operating range.

Rather than heuristically determining nonlinearity order, K, and/or memory length, Q, such parameters may be determined by programming a processor with a behavior model and generating a calibration signal for a calibration mode. This allows parameterization of a digital predistorter in the field, and such parameterization may be local to not just a particular power amplifier which such digital predistorter feeds but also environmental conditions affecting operation of a transmission system having such power amplifier. Accordingly, described below in additional detail is parameterization of a digital predistorter, as well as circuits and systems therefor, by generating a calibration signal for obtaining feedback data input to provide to a behavior model of a power amplifier for execution of such behavior model by a programmed processor.

Figure 1:
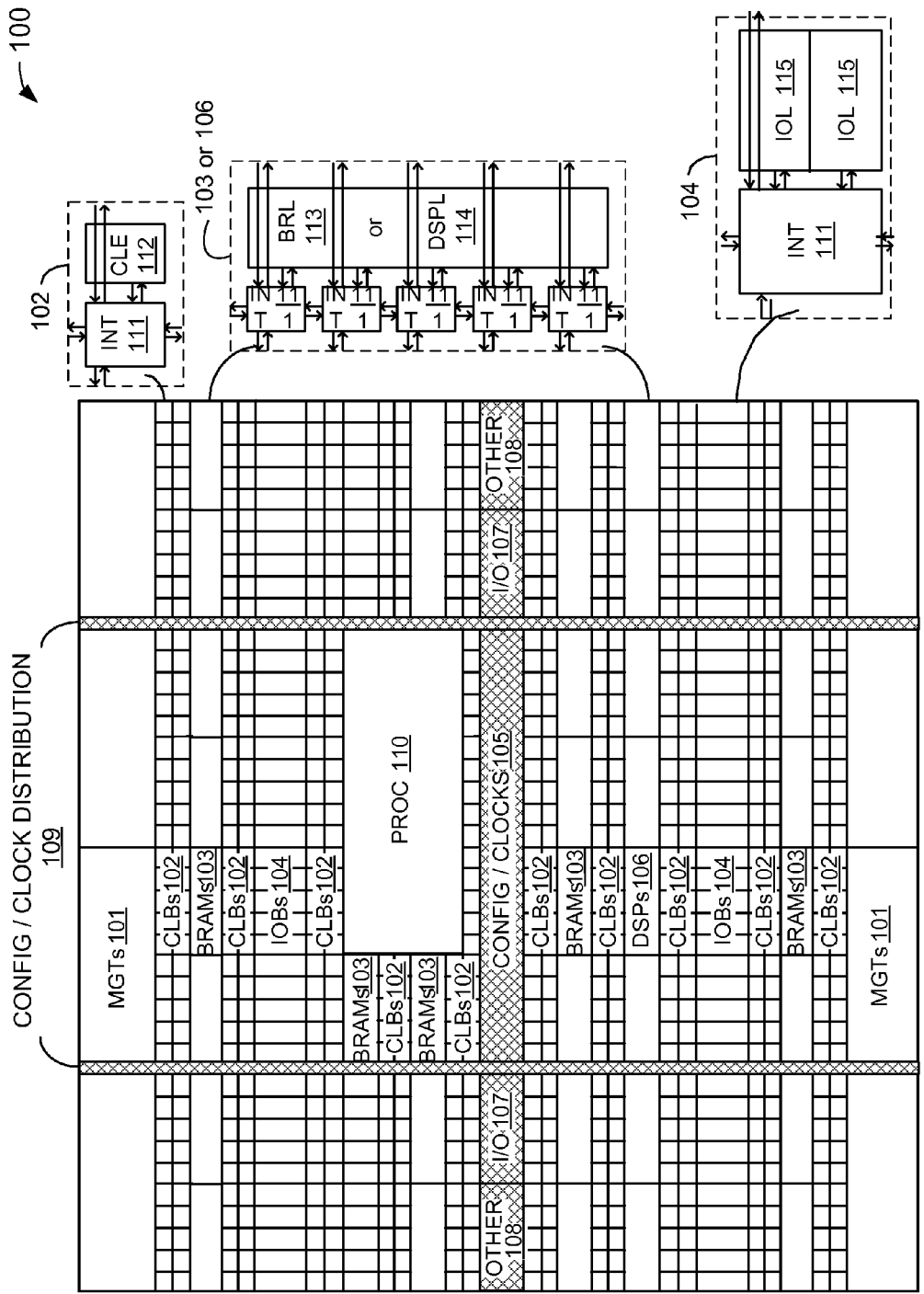
FIG. 1 is a simplified block diagram depicting an exemplary embodiment of a columnar Field Programmable Gate Array ("FPGA") architecture in which one or more aspects of the invention may be implemented.

A portion of a wideband transmission system may be implemented using one or more FPGAs. Advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
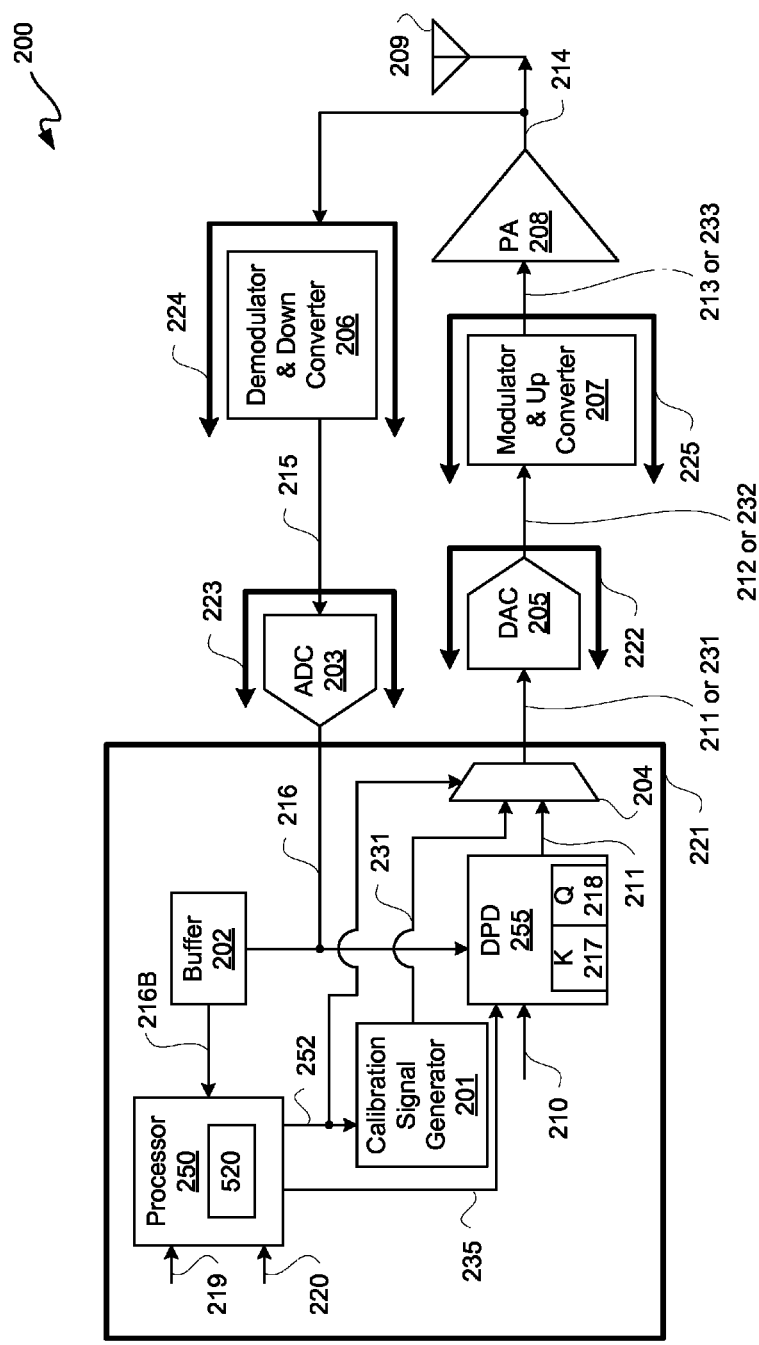
FIG. 2 is a block diagram depicting an exemplary embodiment of a transmission system.

FIG. 2 is a block diagram depicting an exemplary embodiment of a transmission system 200. Transmission system 200 may include antenna array 209, power amplifier ("PA") 208, demodulator and down converter 206, modulator and up converter 207, digital-to-analog converter ("DAC") 205, analog-to-digital converter ("ADC") 203, and system-on-chip ("SoC") 221. In other embodiments, one or more of DAC 205, ADC 203, demodulator and down converter 206, and modulator and up converter 207 may be included as part of SoC 221, namely part of the same IC, as generally indicated by lines 222 through 225, respectively. In an embodiment where SoC 221 is provided as a PLD, such as FPGA 100 of FIG. 1, one or more of DAC 205, ADC 203, demodulator and down converter 206, and modulator and up converter 207 may be included as hardware blocks and/or instantiated in programmable fabric of such FPGA 100. SoC 221 may include processor 250, optional buffer 202, calibration signal generator 201, digital pre-distorter ("DPD") 255, and multiplexer 204. It should be understood that one or more of processor 250, buffer 202, calibration signal generator 201, and multiplexer 204 may be included as hardware blocks and/or instantiated in programmable fabric of such FPGA 100. DPD 255 may be a parameterizable hardware block or instantiated in programmable fabric or a combination thereof. Furthermore, calibration signal generator 201 may be internal to or external from SoC 221.

Programmed processor 250 may be programmed with a known operating system, which may be Mac OS, Java Virtual Machine, Real-Time OS Linux, Solaris, Unix, or a Windows operating system, among other known platforms for execution of behavior model 520. Programmed processor 250 may be a type of microprocessor, such as available from IBM, Intel, ARM, and Advanced Micro Devices for example. Support circuits (not shown) may include cache, power supplies, clock circuits, data registers, and the like.

In an operational transmission mode, DPD 255 receives an input voltage, or more particularly an input modulation signal 210. DPD 255 is parameterized or otherwise configured with predistortion values to distort input modulation signal 210 to provide digital predistorted modulation signal 211. As previously described, such read distortion values may include non-linearity order, K, and memory length, Q.

In an operational mode, control signal 252 which is provided as a select signal to multiplexer 204 may be de-asserted causing multiplexer 204 to output digital predistorted modulation signal 211 for input to DAC 205. Output of DAC 205, which may be an analog predistorted modulation signal 212, is provided as an input to modulator and up converter 207. Modulator and up converter 207 modulates such analog predistorted modulation signal 212 onto a carrier signal to provide a predistorted radio frequency ("RF") signal 213; furthermore, modulator and a converter 207 up converts such analog predistorted modulation signal, which is at a baseband frequency, to a transmission frequency of such carrier signal. Thus, such predistorted RF signal 213 output from modulator and up converter 207 is at a transmission frequency for input to power amplifier 208. Power amplifier 208 provides an RF output, or more particularly an amplified RF transmission signal ("transmission signal") 214 at such transmission frequency for antenna array 209. Antenna array 209 may include one or more antennas. Additionally, transmission signal 214 is fed back to demodulator and down converter 206.

Demodulator and down converter 206 demodulates and converts transmission signal 214 to an analog feedback signal 215 at a baseband frequency. Analog feedback signal 215 is provided as an input to ADC 203 for conversion into digital feedback signal 216. Digital feedback signal 216 is provided as an input to DPD 255. More particularly, digital feedback signal 216 is a feedback voltage provided to DPD 255 as a feedback predistortion update for gain values at a baseband frequency.

However, prior to an operational mode as previously described, a calibration mode may be invoked or otherwise entered such that DPD 255 is parameterized with at least one parameter for initially setting gain values among other parameters for predistortion. More particularly, at least one of non-linearity order, K, 217 and memory length, Q, 218 is set in DPD 255 as a result from a calibration mode.

Assuming transmission system 200 is in a calibration mode and not an operational mode as previously described, control signal 252 is asserted by processor 250 responsive to providing a calibration mode instruction to processor 250 via instruction input 219. Processor 250 is programmed with a behavior model 520. Behavior model 520 may be any of a variety of models for mathematically representing power amplification of a power amplifier, such as power amplifier 208 in this exemplary embodiment. Examples of behavior models 520 include without limitation a Weiner model, a parallel Weiner model, a Volterra model, and a memory polynomial model.

Assertion of control signal 252 provided to calibration signal generator 201 causes calibration signal generator 201 to generate a digital calibration signal 231, which digital calibration signal 231 is output to multiplexer 204. Digital calibration signal 231 is not predistorted as was digital predistorted modulation signal 211. Thus, for clearly distinguishing predistorted and non-predistorted signals along a feed forward path of transmission system 200, separate reference numbers are used even though such signals may travel the same signal paths. Furthermore, responsive to assertion of control signal 252, multiplexer 204 selects input of digital calibration signal 231 as an output. Digital calibration signal 231 is provided to DAC 205. DAC 205 converts digital calibration signal to an analog calibration signal 232. Analog calibration signal 232 is provided from an output of DAC 205 to an input of modulator and up converter 207. Modulator and up converter 207 modulates analog calibration signal 232 onto a carrier signal 233. Additionally, modulator and a converter 207 up converts analog calibration signal 232 from a baseband frequency to a transmission frequency of carrier signal 233.

Carrier signal 233 modulator with analog calibration signal 232 at a transmission frequency is provided as input to power amplifier 208. Power amplifier 208 amplifies such carrier signal 233, namely converts DC to RF responsive to carrier signal 233, to provide transmission signal 214. However, it should be understood that transmission signal 214 for transmission system 200 in a calibration mode is not for transmission via antenna array 209 for subsequent reception. Rather, transmission signal 214 in a calibration mode is for feedback, as described below in additional detail.

Transmission signal 214, as previously described, is provided as an input to demodulator and down converter 206 to produce analog feedback signal 215, and as previously described, analog feedback signal 215 is provided as an input to ADC 203 to produce digital feedback signal 216. Analog feedback signal 215 is a version of analog calibration signal 232 after power amplification by power amplifier 208. In a calibration mode, digital feedback signal 216 is provided as input to processor 250. Optionally, digital feedback signal 216 may be provided as an input to buffer 202, and output of feedback data from digital feedback signal 216 from buffer 202 may be provided to processor 250. For purposes of clarity and not limitation, such feedback data input is generally indicated as digital feedback signal 216B output from buffer 202.

Again, processor 250 is programmed or otherwise configured with a behavior model 520, as previously described. Such behavior model 520 may be for power amplifier 208. Programmed processor 250 may be configured to execute behavior model 520 with digital feedback signal 216 as input to quantify nonlinearity and/or memory effects of power amplifier 208. Execution of such behavior model 520 may include execution of an iterative process for such quantification of memory length Q. Examples of such iterative process include without limitation a nonlinear least squares lattice algorithm, a Volterra least squares lattice algorithm, a recursive-least-squares algorithm, and a least-mean-square algorithm. Responsive to one or more inputs from digital feedback signal 216, behavior model 520 generates at least one parameter for parameterizing DPD 255.

As previously described, the at least one parameter generated by behavior model 520 may be a nonlinearity order, K, and/or a memory length, Q. Power amplifying by power amplifier 208 may be sufficiently high power amplification for a wideband system. Such a wideband system may be a CDMA system or in OFDM system.

Power amplifier 208 may have memory effects. Programmed processor 250 may be configured to execute behavior model 520 with data from digital feedback signal 216 as input to quantify the memory effects of power amplifier 208. Programmed processor 250 may be configured to determine an estimate of a maximum delay of power amplifier 208 for quantification of such memory effects to provide memory length, Q.

Such at least one parameter is provided from processor 250 to DPD 255 via parameter data signal 235. DPD 255 therefore is parameterized with such at least one parameter obtained from parameter data signal 235 for a subsequent operational mode. DPD 255 may be an adaptive digital baseband predistorter configured with K and Q to compensate for nonlinearity of power amplifier 208. After calibration of transmission system 200, a calibration mode instruction provided via instruction input 219 to processor 250 may be de-asserted or otherwise indicated as completed, which in turn causes processor 250 to de-assert control signal 252. Thus, in an operational mode, output of digital predistorted modulation signal 211 from DPD 255 is provided as output from multiplexer 204.

In another embodiment, a predefined nonlinearity order, K, is provided as data input to processor 250, such as via data input 220 of processor 250. Such predefined nonlinearity order, K, as well as memory length Q after determination, may be provided from processor 250 to DPD 255 via parameter data signal 235.

Figure 3:
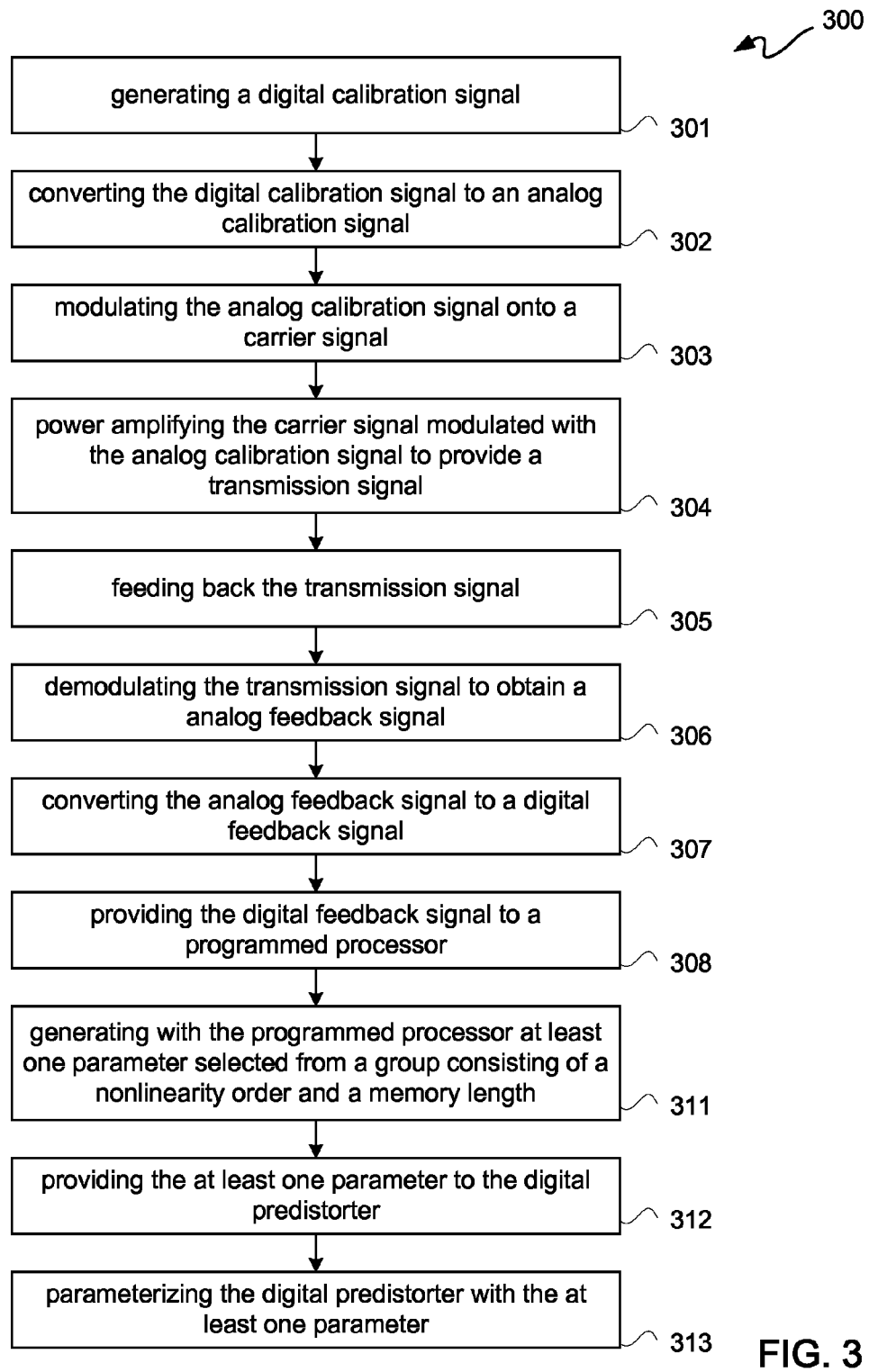
FIG. 3 is a flow diagram depicting an exemplary embodiment of a parameterization process for parameterizing a digital predistorter.

FIG. 3 is a flow diagram depicting an exemplary embodiment of a parameterization process 300 for parameterizing a DPD 255. At 301, a digital calibration signal is generated for a calibration mode. At 302, the digital calibration signal is converted to an analog calibration signal. At 303 the analog calibration signal is modulated onto a carrier signal. At 304, the carrier signal modulated with the analog calibration signal is power amplified to provide a transmission signal for feedback for calibration.

At 305, the transmission signal provided at 304 is fed back for demodulating to obtain an analog feedback signal at 306. At 307, the analog feedback signal is converted to a digital feedback signal. At 308, the digital feedback signal is provided to a programmed processor. At 311, with data obtained from the digital feedback signal as input, such program processor generates at least one parameter for digital predistortion. Such at least one parameter may be a nonlinearity order, K, and/or a memory length, Q. At 312, such at least one parameter is provided to a digital predistorter. At 313, such digital predistorter is parameterized with the at least one parameter for providing a predistorted modulation signal for subsequent power amplification, where such predistortion reduces nonlinearity or enhances linearity of operation of a power amplifier.

Figure 4:
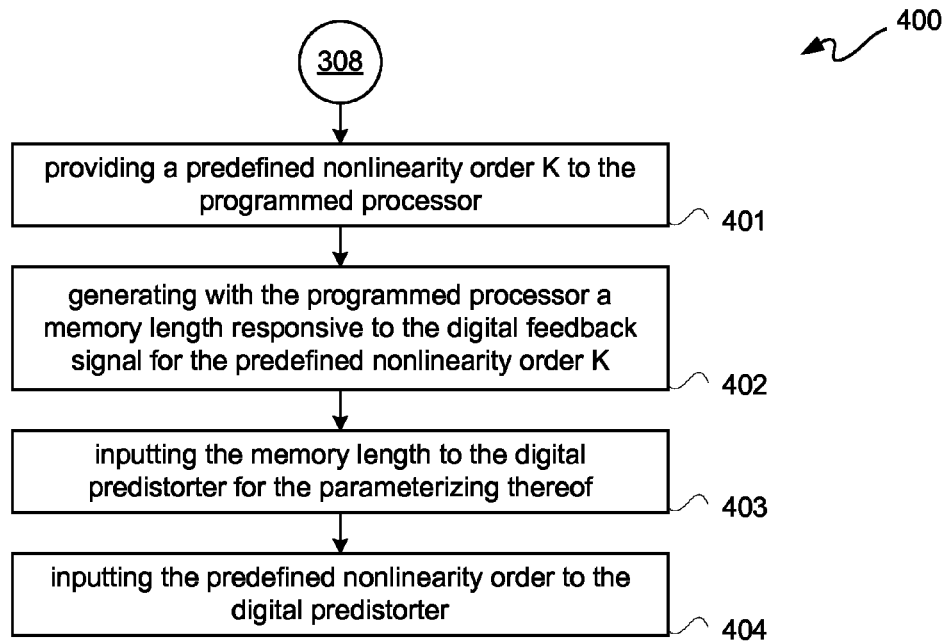
FIG. 4 is a flow diagram depicting another exemplary embodiment of a parameterization process for parameterizing a digital predistorter.

FIG. 4 is a flow diagram depicting another exemplary embodiment of a parameterization process 400 for parameterizing a DPD 255. Parameterization process 400 is the same as parameterization process 300 of FIG. 3 with respect to operations 301 through 308, and accordingly, such description is not repeated for purposes of clarity. After 308, a predefined nonlinearity order, K, is provided to such programmed processor at 401. In an embodiment, such predefined nonlinearity order, K, may be 3. However, in another embodiment, such predefined nonlinearity order, K, may be 5 or 10. Accordingly, any of a number of positive integer values may be used for K.

At 402, with data obtained from a digital feedback signal, such program processor generates a memory length, Q, for such predefined nonlinearity order, K. At 403, such memory like generated at 402 is input to a digital predistorter for parameterization or other conditioning thereof. At 404, such predefined nonlinearity order can be input to such digital predistorter for additional parameterization or conditioning thereof.

Figure 5:
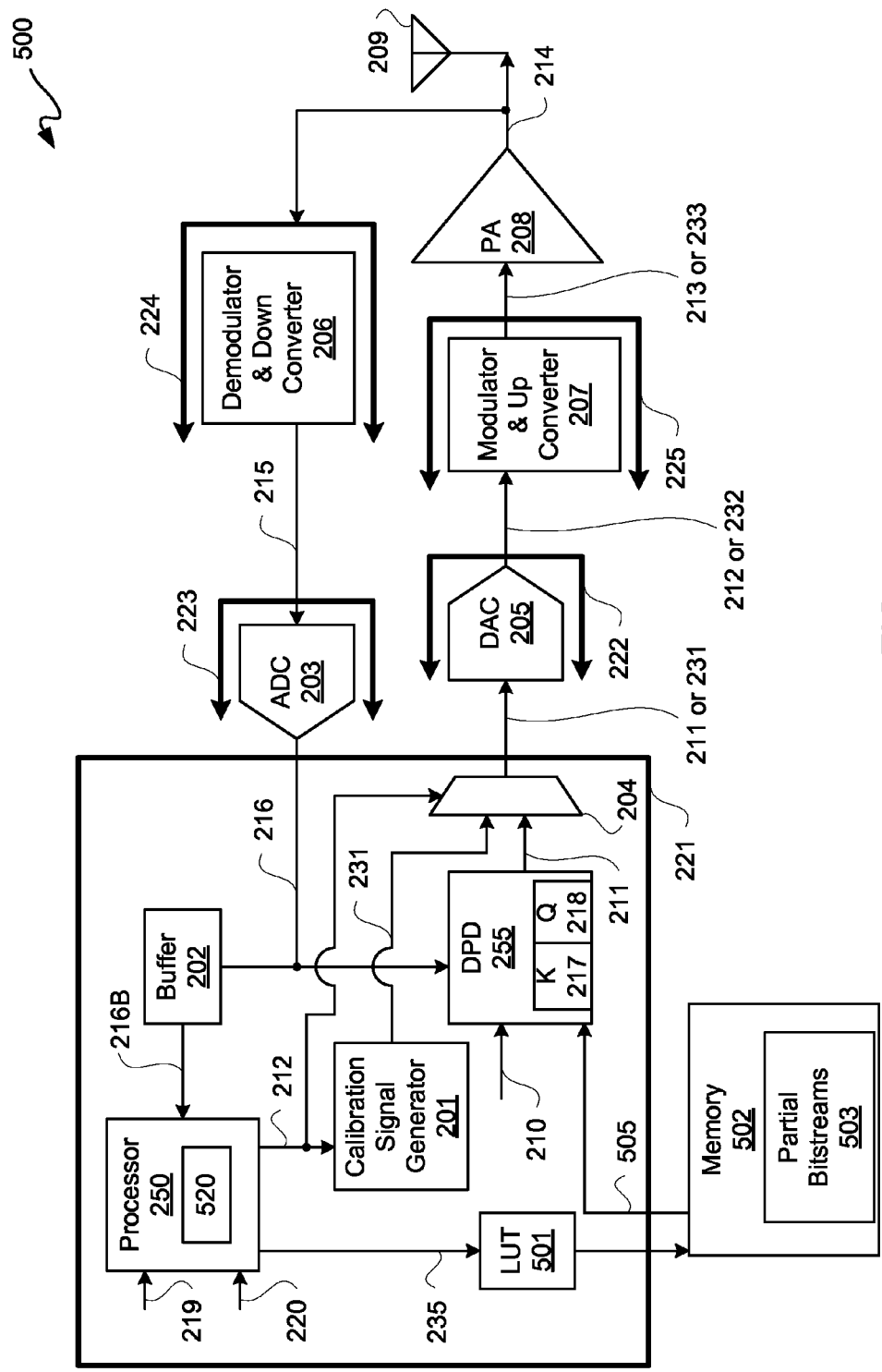
FIG. 5 is a block diagram depicting another exemplary embodiment of a transmission system.

FIG. 5 is a block diagram depicting another exemplary embodiment of a transmission system 500. In this exemplary embodiment, a lookup table ("LUT") 501 and a memory 502 have been added to transmission system 200 of FIG. 2 to provide transmission system 500. For purposes of clarity, the description of transmission system 200 of FIG. 2 is not repeated; and thus, generally only the differences as between the two transmission systems are described below in additional detail. Memory 502 may be coupled to an interface 505 of SoC 221 for programming configuration memory cells thereof to instantiate K and/or Q in DPD 255 or instantiating DPD 255 having K and/or Q parameters. In another embodiment, memory 502 may be part of SoC 221. Programmable resources for instantiation of DPD 255 in whole or in part are described above in additional detail with reference to FIG. 1.

In the field, it may not be known beforehand what values of K and/or Q are to be selected for DPD 255 for predistortion to feed power amplifier 208. Using programmable resources, a particular K and/or Q determined for power amplifier 208 may be instantiated, for example, to augment DPD 255 for self-configuration thereof.

Values of K and/or Q generated by behavior model 520 executed by processor 250 may be provided via parameter data signal 235 to LUT 501 as one or more indices to such LUT. In another embodiment, a predetermined value of K may be provided to LUT 501, along with a processor determined value of Q.

LUT 501 may have values of K and/or Q associated with addresses to memory 502. Thus, in response to receiving a value for K and a value for Q, for example, via parameter data signal 235, LUT 501 may output a first address for a first partial bitstream and a second address for a second partial bitstream of partial bitstreams 503 for modification of DPD 255 to reflect the value of K and the value of Q, respectively, obtained via parameter data signal 235. In other words, such first address and such second address may be used to read memory 502 at such respective addresses to read out such first partial bitstream and such second partial bitstream stored at such respective addresses. In another embodiment, partial bitstreams may be stored for pairs of values of K and Q.

Continuing the above example for purposes of clarity and not limitation, if DPD 255 is instantiated with a default configuration or not yet instantiated at all for a calibration mode, then using programmable resources of SoC 221, DPD 255 may be partially or completely instantiated with one or more partial bitstreams from partial bitstreams 503 to parameterize or configured DPD 255 to operate with a value of K and/or a value of Q returned from processor 250 via parameter data signal 235. Such first partial bitstream and/or such second partial bitstream may be provided to an interface 505 for instantiation as previously described.

Accordingly, by tailoring DPD 255 to particular values of K and/or Q in the field, in contrast to having a hardwired DPD fixed with large values of K and Q to accommodate a variety of applications, resource allocation may be enhanced. In other words, a smaller DPD 255 may be used by tailoring circuit resources to a particular application. Thus, such a tailored DPD may use fewer circuit resources and likewise consumes less power than such a hardwired DPD attempting to cover a variety of power amplifiers. For example, if an application where K and Q are each 10 for sufficient predistortion, then a DPD with hardwired circuit resources, including for example multipliers and accumulators, for K of 50 and Q of 50 would mean that more circuit resources would be used than needed for such application. However, by tailoring DPD 255 to a particular application, fewer circuit resources may be used, and thus sample rate may be increased.

In another embodiment, calibration signal generator 201 may be instantiated using programmable resources responsive to entering a calibration mode. In other words, a partial bitstream, such as of partial bitstreams 503, may be obtained responsive to entering a calibration mode for instantiation of calibration signal generator 201, and optionally one or more of buffer 202 and multiplexer 204 may likewise be instantiated in programmable fabric. Furthermore, in yet another embodiment, circuitry for execution of behavior model 520 may be instantiated in programmable resources. In other words, a partial bitstream, such as of partial bitstreams 503, may be obtained responsive to entering a calibration mode for instantiation of behavior model 520 circuitry. Once a calibration mode is exited, programmable resources used for providing calibration signal generator 201 or other circuitry for a calibration mode may be returned to a pool of available programmable resources.

Figure 6:
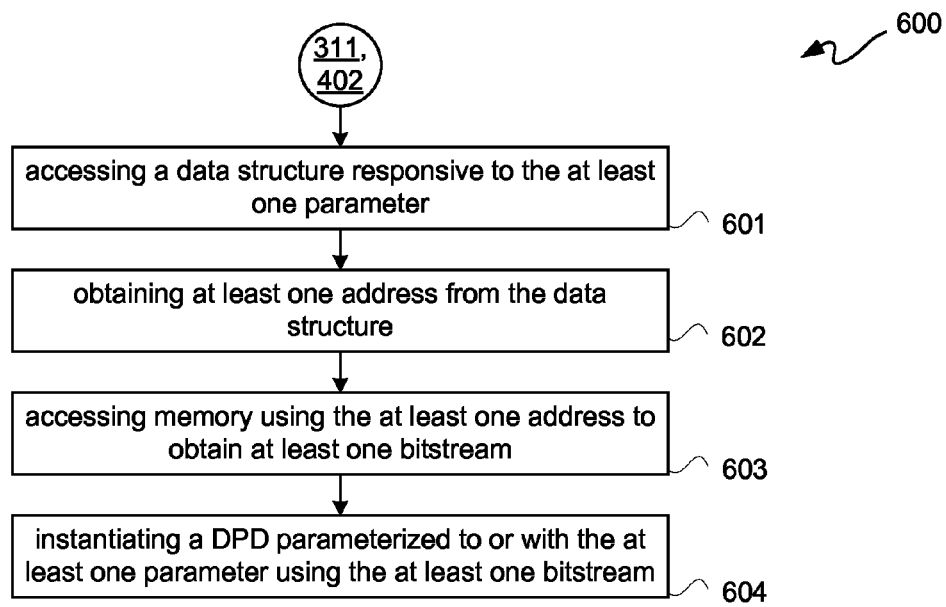
FIG. 6 is a flow diagram depicting another exemplary embodiment of a parameterization process for parameterizing a digital predistorter.

FIG. 6 is a flow diagram depicting another exemplary embodiment of a parameterization process 600 for parameterizing a DPD 255. Parameterization process 600 is the same as parameterization process 300 of FIG. 3 with respect to operations 301 through 308 and 311, or parameterization process 400 of FIG. 4 with respect to operations 301 through 308, 401, and 402, accordingly, such description is not repeated for purposes of clarity.

After 311 or 402, at 601 a table or other data structure, such as LUT 501 of FIG. 5 for example, is accessed using at least one parameter, namely a nonlinearity order, K, whether predefined or in-the-field processor determined, and/or a memory length, Q. At 602, using such at least one parameter as an index, LUT 501 looks up at least one address for memory and returns or outputs such at least one address. Such at least one address is associated with at least one bitstream, including without limitation a whole or partial bitstream for instantiation of DPD 255 of FIG. 5 using programmable resources, stored in such memory, such as memory 502 for example, and such at least one bitstream is for a DPD design having such at least one parameter. At 603, such at least one address is used to access such at least one bitstream from memory, and at 604, a DPD 255 is instantiated in whole or in part in programmable resources parameterized to or with such at least one parameter using such at least one bitstream.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. A method for parameterizing a digital predistorter, comprising:
   generating a digital calibration signal;
   converting the digital calibration signal to an analog calibration signal;
   modulating the analog calibration signal onto a carrier signal;
   power amplifying the carrier signal modulated with the analog calibration signal to provide a transmission signal;
   feeding back the transmission signal;
   demodulating the transmission signal to obtain an analog feedback signal;
   wherein the analog feedback signal is a version of the analog calibration signal after power amplification;
   converting the analog feedback signal to a digital feedback signal;
   providing the digital feedback signal to a programmed processor;
   generating, with the programmed processor, at least one parameter selected from a group consisting of a nonlinearity order and a memory length; and
   providing the digital predistorter parameterized with the at least one parameter.

2. The method according to claim 1, wherein:
   the power amplifying is sufficiently high for power amplification for a wideband system; and
   the wideband system is selected from a group consisting of a code division multiple access system and an orthogonal frequency division multiplexing system.

3. The method according to claim 1, wherein:
   the digital predistorter is an adaptive digital baseband predistorter configured to compensate for nonlinearity of a power amplifier used for the power amplifying; and
   the power amplifier has memory effects.

4. The method according to claim 3, wherein:
   the programmed processor is configured with a behavior model of the power amplifier; and
   the programmed processor is configured to execute the behavior model with the digital feedback signal as input to quantify the nonlinearity and the memory effects of the power amplifier.

5. The method according to claim 4, wherein the providing the digital predistorter parameterized with the at least one parameter includes:
   providing the at least one parameter to the digital predistorter; and
   parameterizing the digital predistorter with the at least one parameter.

6. The method according to claim 4, further comprising:
   accessing a data structure responsive to the at least one parameter;
   obtaining at least one address from the data structure;
   accessing a memory using the at least one address to obtain at least one bitstream therefrom; and
   instantiating the digital predistorter in programmable resources programmed with the at least one bitstream to provide the digital predistorter parameterized with the at least one parameter.

7. The method according to claim 4, wherein:
   the behavior model is selected from a group consisting of a Weiner model, a parallel Weiner model, a Volterra model, and a memory polynomial model; and the programmed processor is further configured to execute an iterative process selected from a group consisting of a nonlinear least squares lattice algorithm, a Volterra least squares lattice algorithm, a recursive-least-squares algorithm, and a least-mean-square algorithm to determine the memory length.

8. A method for parameterizing a digital predistorter, comprising:
generating a digital calibration signal at a baseband frequency;
converting the digital calibration signal to an analog calibration signal at the baseband frequency;
modulating and up converting the analog calibration signal onto a carrier signal at a transmission frequency;
power amplifying with a power amplifier the carrier signal modulated with the analog calibration signal to provide a transmission signal;
feeding back the transmission signal;
demodulating and down converting the transmission signal to obtain an analog feedback signal at the baseband frequency;
wherein the analog feedback signal is a version of the analog calibration signal after power amplification;
converting the analog feedback signal to a digital feedback signal;
providing the digital feedback signal to a programmed processor;
providing a predefined nonlinearity order to the programmed processor;
generating with the programmed processor a memory length responsive to the digital feedback signal for the predefined nonlinearity order; and
providing the digital predistorter parameterized with the memory length.

9. The method according to claim 8, wherein:
the memory length is input to the digital predistorter for the parameterizing thereof; and
the predefined nonlinearity order is input to the digital predistorter for the parameterizing thereof.

10. The method according to claim 8, wherein the providing the digital predistorter parameterized with the memory length includes:
accessing a data structure responsive to the memory length;
obtaining at least one address from the data structure;
accessing a memory using the at least one address to obtain at least one bitstream therefrom; and
instantiating the digital predistorter in programmable resources programmed with the at least one bitstream to provide the digital predistorter parameterized with the memory length.

11. The method according to claim 8, wherein:
the power amplifying is high power amplification for a wideband system;
the programmed processor is configured with a behavior model of the power amplifier; and
the programmed processor is configured to execute the behavior model with data from the digital feedback signal as input to quantify memory effects of the power amplifier.

12. The method according to claim 11, wherein the programmed processor is configured to determine an estimate of a maximum delay of the power amplifier for quantification of the memory effects to provide the memory length.

13. An integrated circuit, comprising:
a processor programmed with a behavior model associated with power amplification;
a calibration signal generator coupled to the processor and configured to generate a digital calibration signal;
wherein the processor is coupled to receive a digital feedback signal;
wherein the processor is configured to determine at least one parameter associated with the power amplification in response to the digital feedback signal using the behavior model;
wherein the at least one parameter is selected from a group consisting of a nonlinearity order and a memory length;
a digital predistorter coupled for parameterization thereof responsive to the at least one parameter.

14. The integrated circuit according to claim 13, further comprising:
a look-up table coupled to the processor to receive the at least one parameter as an index thereto;
a memory coupled to the look-up table to receive at least one address therefrom responsive to access thereof using the at least one parameter;
wherein the memory is for storing at least one bitstream for access responsive to the at least one address; and
programmable resources coupled to the memory to receive and instantiate the at least one bitstream to provide in whole or in part the digital predistorter parameterized in accordance with the at least one parameter.

15. The integrated circuit according to claim 13, wherein:
the processor is coupled to provide a control signal to the calibration signal generator; and
the processor is configured to assert the control signal responsive to entering a calibration mode.

16. The integrated circuit according to claim 15, further comprising:
a buffer coupled to receive the digital feedback signal and to provide the digital feedback signal to the processor;
a multiplexer coupled to receive the control signal as a select signal;
wherein the multiplexer is further coupled to receive the digital calibration signal and a predistorted modulation signal;
wherein the digital predistorter is configured to provide the predistorted modulation signal responsive to an input modulation signal; and
wherein the multiplexer is configured to output the digital calibration signal responsive to assertion of the control signal for the calibration mode and to output the predistorted modulation signal responsive to de-assertion of the control signal for a transmission mode.

17. A system including the integrated circuit of claim 13, the system comprising:
a digital-to-analog converter coupled to receive the digital calibration signal and configured to convert the digital calibration signal to an analog calibration signal at a baseband frequency;
a modulator and up converter coupled to receive the analog calibration signal and configured to modulate and up convert the analog calibration signal onto a carrier signal at a transmission frequency;
a demodulator and down converter coupled to receive a transmission signal and configured to demodulate and down convert the transmission signal to obtain an analog feedback signal at the baseband frequency; and
an analog-to-digital converter coupled to receive the analog feedback signal and configured to convert the analog feedback signal to the digital feedback signal;
wherein the digital predistorter is coupled to receive the digital feedback signal.

18. The system according to claim 17, further comprising:
a power amplifier coupled to receive the carrier signal modulated with the analog calibration signal and configured to power amplify the carrier signal modulated with the analog calibration signal to provide the transmission signal;
wherein the analog feedback signal is a version of the analog calibration signal after amplification by the power amplifier; and
wherein the power amplifier is for a wideband system.

19. The system according to claim 18, wherein the wideband system is selected from a group consisting of a code division multiple access system and an orthogonal frequency division multiplexing system.

20. The system according to claim 18, wherein:
the digital predistorter is an adaptive digital baseband predistorter configured to compensate for nonlinearity of the power amplifier; and
the power amplifier has memory effects.

\* \* \* \* \*